United States Patent Office 3,576,814
Patented Apr. 27, 1971

3,576,814
N-ARYL PYRID-2-ONES
Michael C. Seidel, Levittown, Kenneth L. Viste, Warminster, and Roy Y. Yih, Doylestown, Pa., assignors to Rohm and Haas Company, Philadelphia, Pa.
No Drawing. Continuation of application Ser. No. 779,198, Nov. 26, 1968, which is a continuation-in-part of application Ser. No. 698,106, Jan. 16, 1968.
This application Jan. 30, 1970, Ser. No. 7,256
Int. Cl. C07d 31/36
U.S. Cl. 260—295.5
5 Claims

ABSTRACT OF THE DISCLOSURE

Novel compounds belonging to the class of N-arylpyrid-2-one-4,6-dialkyl (and 4,5,6-trisubstituted)-3-carboxylic acids and their amides, esters and physiologically acceptable salts. These compounds possess biological activity and in particular are plant growth regulators.

CROSS REFERENCE TO RELATED APPLICATIONS

This application is a continuation of our copending application, U.S. Ser. No. 779,198 filed Nov. 26, 1968, now abandoned, which in turn is a continuation-in-part of our copending application, U.S. Ser. No. 698,106 filed Jan. 16, 1968 now Pat. No. 3,503,986 granted on Mar. 31, 1970.

This invention is concerned with new organic compounds belonging to the general class of N-aryl pyrid-2-ones. It also relates to the biological activity of these structures. In particular they are useful for influencing the growth and development of plants in various ways as will be more fully developed hereinafter.

These new structures may be depicted by the general formula

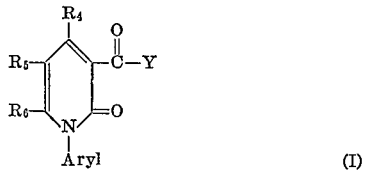

wherein $R_4$ and $R_6$ are methyl or ethyl, $R_5$ is hydrogen, methyl, ethyl or chlorine, Y is selected from the group consisting of Br, Cl, $NH_2$ and OR wherein R is hydrogen, alkyl groups of 1 to 5 carbon atoms or a physiologically acceptable salt-forming cation.

Aryl is selected from the group consisting of

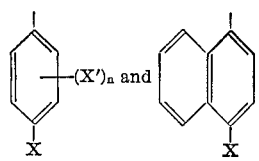

wherein:

X is selected from the group consisting of amino, fluoro, chloro, bromo, iodo, alkyl of 1 to 5 carbon atoms, trifluoromethyl, methoxy and nitro,
X' is selected from the group consisting of fluoro, chloro, bromo, iodo, methyl, trifluoromethyl and methoxy,
$n$ is 0, 1 or 2 and
X in

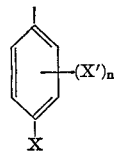

may be hydrogen when $n$ is 1 or 2 and X' is at least one halogen in the 3-position.

The most closely related compound to these known in the literature is 1-phenyl-4,6-dimethylpyrid-2-one-3-carboxamide. This was prepared by W. Reid et al. as described in Annalen 626, 110 (1959). The method used was the condensation of cyanoacetanilide with acetylacetone to produce 1-phenyl-4,6-dimethyl-3-cyanopyrid-2-one which was then hydrolyzed to the corresponding 3-carboxamide.

Typical compounds within the scope of this invention include:

1-(3-fluorophenyl)-3-carboxy-4,6-dimethylpyrid-2-one
1-(3-chlorophenyl)-3-carboxy-4,6-dimethylpyrid-2-one
1-(3-bromophenyl)-3-carboxy-4,6-dimethylpyrid-2-one
1-(3-iodophenyl)-3-carboxy-4,6-dimethylpyrid-2-one
1-(4-aminophenyl)-3-carboxy-4,6-dimethylpyrid-2-one
1-(4-fluorophenyl)-3-carboxy-4,6-dimethylpyrid-2-one
1-(4-chlorophenyl)-3-carboxy-4,6-dimethylpyrid-2-one
1-(4-bromophenyl)-3-carboxy-4,6-dimethylpyrid-2-one
1-(4-iodophenyl)-3-carboxy-4,6-dimethylpyrid-2-one
1-(4-methylphenyl)-3-carboxy-4,6-dimethylpyrid-2-one
1-(4-methoxyphenyl)-3-carboxy-4,6-dimethylpyrid-2-one
1-(2,4-dichlorophenyl)-3-carboxy-4,6-dimethylpyrid-2-one
1-(2,4-dibromophenyl)-3-carboxy-4,6-dimethylpyrid-2-one
1-(2-methyl-4-chlorophenyl)-3-carboxy-4,6-dimethylpyrid-2-one
1-(2-chloro-4-methylphenyl-3-carboxy-4,6-dimethylpyrid-2-one
1-(2-methoxy-4-bromophenyl)-3-carboxy-4,6-dimethylpyrid-2-one
1-(2-fluoro-4-chlorophenyl)-3-carboxy-4,6-dimethylpyrid-2-one
1-(3-fluoro-4-chlorophenyl)-3-carboxy-4,6-dimethylpyrid-2-one
1-(3,4-dichlorophenyl)-3-carboxy-4,6-dimethylpyrid-2-one
1-(3-chloro-4-bromophenyl)-3-carboxy-4,6-dimethylpyrid-2-one
1-(3-chloro-4-methylphenyl)-3-carboxy-4,6-dimethylpyrid-2-one
1-(4-chloro-3-methylphenyl)-3-carboxy-4,6-dimethylpyrid-2-one
1-(3-methyl-4-methoxyphenyl)-3-carboxy-4,6-dimethylpyrid-2-one
1-(3,4-dimethylphenyl)-3-carboxy-4,6-dimethylpyrid-2-one
1-(3-chloro-4-methoxyphenyl)-3-carboxy-4,6-dimethylpyrid-2-one
1-(3-chloro-4-nitrophenyl)-3-carboxy-4,6-dimethylpyrid-2-one
1-(2,3,4-trichlorophenyl)-3-carboxy-4,6-dimethylpyrid-2-one
1-(2,4,6-trichlorophenyl)-3-carboxy-4,6-dimethylpyrid-2-one
1-(2-methyl-3,4-dichlorophenyl)-3-carboxy-4,6-dimethylpyrid-2-one
1-(4-methyl-2,3-dichlorophenyl)-3-carboxy-4,6-dimethylpyrid-2-one
1-(4-methyl-2-chloro-6-fluorophenyl)-3-carboxy-4,6-dimethylpyrid-2-one 1-(4-fluoronaphthyl)-3-carboxy-4,6-dimethylpyrid-2-one
1-(4-methylnaphthyl)-3-carboxy-4,6-dimethylpyrid-2-one
1-(4-trifluoromethylnaphthyl)-3-carboxy-4,6-dimethylpyrid-2-one
1-(4-methoxynaphthyl)-3-carboxy-4,6-dimethylpyrid-2-one and salts of the above
1-(3-iodophenyl)-3-carbamyl-4,6-dimethylpyrid-2-one
1-(4-methylphenyl)-3-carbamyl-4,6-dimethylpyrid-2-one
1-(4-methoxyphenyl)-3-carbamyl-4,6-dimethylpyrid-2-one
1-(4-bromophenyl)-3-carbamyl-4,6-dimethylpyrid-2-one
1-(4-chlorophenyl)-3-carbamyl-4,6-dimethylpyrid-2-one
1-(2,4-dichlorophenyl)-3-carbamyl-4,6-dimethylpyrid-2-one
1-(2,4-dimethylphenyl)-3-carbamyl-4,6-dimethylpyrid-2-one
1-(2-bromo-4-methylphenyl)-3-carbamyl-4,6-dimethylpyrid-2-one
1-(2-bromo-4-fluorophenyl-3-carbamyl-4,6-dimethylpyrid-2-one
1-(3-methyl-4-fluorophenyl)-3-carbamyl-4,6-dimethylpyrid-2-one
1-(3,4-dichlorophenyl)-3-carbamyl-4,6-dimethylpyrid-2-one
1-(3,4-dimethylphenyl)-3-carbamyl-4,6-dimethylpyrid-2-one
1-(3,4-dimethoxyphenyl)-3-carbamyl-4,6-dimethylpyrid-2-one
1-(3,4-dibromophenyl)-3-carbamyl-4,6-dimethylpyrid-2-one
1-(3,4-difluorophenyl)-3-carbamyl-4,6-dimethylpyrid-2-one
1-(3-chloro-4-methoxyphenyl)-3-carbamyl-4,6-dimethylpyrid-2-one
1-(3-methyl-4-bromophenyl)-3-carbamyl-4,6-dimethylpyrid-2-one
1-(2,4,6-trichlorophenyl)-3-carbamyl-4,6-dimethylpyrid-2-one
1-(2,3,4-trichlorophenyl)-3-carbamyl-4,6-dimethylpyrid-2-one
1-(3,4-dichlorophenyl)-3-methoxycarbonyl-4,6-dimethylpyrid-2-one
1-(4-chlorophenyl)-3-ethoxycarbonyl-4,6-dimethylpyrid-2-one Based on plant growth regulatory activity, preferred compounds of this invention include 1-(4-chlorophenyl)-3 - carboxy - 4,6 - dimethylpyrid - 2 - one, 1 - (3,4 - dichlorophenyl) - 3 - carboxy - 4,6 - dimethylpyrid - 2 - one and their water-soluble salts.

Water soluble salts of the compounds of this invention where Y of Formula I is OH include the alkali metal salts, preferably the sodium and potassium; the ammonium; mono, di and trialkylammonium wherein each alkyl group may contain up to 4 carbon atoms, preferably methylammonium, dimethylammonium, trimethylammonium and triethylammonium; ethanolamine and propanolamine salts such as the 2-hydroxyethylammonium, 2 - hydroxypropyl ammonium, bis(2 - hydroxyethyl)ammonium and tris((2 - hydroxyethyl)ammonium; and quaternary ammonium salts such as tetramethylammonium and choline. Other useful salts include the alkaline earth salts, particularly the calcium and magnesium, aluminum, cadmium, copper, ferric, ferrous, manganese, nickel and zinc.

The compounds of this invention may be prepared by hydrolysis of 1 - aryl - 3 - cyano - pyrid - 2 - ones corresponding to the formula:

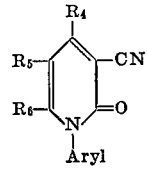
(II)

wherein $R_4$, $R_5$, $R_6$ and aryl have the above meanings. Partial hydrolysis of the —CN group to —$CONH_2$ results in the 1 - aryl - 3 - carbamyl - pyrid - 2 - ones. In many instances hydrolysis results in a mixture of the 3-carbamyl and 3-carboxy derivatives and these may be separated by conventional means such as by converting the 3-carboxy derivative to a water-soluble salt and removing the insoluble 3-carbamyl derivative. The reaction mixture consisting essentially of the two types of hydrolysis products with generally a minor amount of the unreacted cyano precursor can be used for biological purposes directly without separation. Tests on the cyano precursor have shown that it neither has biological activity nor does it interfere with the biological activity of the hydrolysis products.

The 1 - aryl - 3 - cyano - pyrid - 2 - ones (Formula II) may be prepared by condensation of beta-diketones with N-aryl cyanoacetamides of the formula:

$$NCCH_2CONH—Aryl \qquad (III)$$

in the presence of a basic catalyst. The reaction may be depicted as follows, using the mono-enol form of the beta-diketone

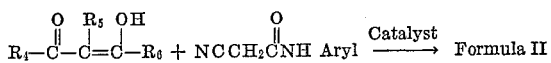

The beta-diketones may be made by the general methods described by J. T. Adams et al. J. Chem. Soc. 66, 1220 (1944) and A. W. Johnson et al. Organic Syntheses 42, 75 (1962). Pentane-2,4-dione is a product of commerce.

N-aryl cyanoacetamides are known compounds which may be made by heating ethyl cyanoacetate with the appropriate aniline or naphthylamine, usually under neat conditions, and removing the ethanol as formed according to the reaction:

$$NCCH_2COOC_2H_5 + H_2N—Aryl \rightarrow Formula\ III + C_2H_5OH$$

This is usually a facile reaction in the temperature range of 150–250° C. The end of the reaction is judged when the removal of ethanol is essentially completed. The reaction product may be purified by standard means, such as recrystallization, or may be used without further purification. Refer to Piccinini et al., Chemishes Zentralblatt 78, 335 (1907).

In the condensation of beta-diketone with the N-aryl acetamide equimolar amounts of the two reactants are normally used, although excesses of either reagent are permissilbe. In some instances, it may be expedient to use an excess of the beta-diketone.

The condensation of the beta-diketone with an N-aryl cyanoacetamide is preferably carried out in the presence of a solvent. Suitable solvents include alcohols, ethers, aliphatic hydrocarbons, aromatic hydrocarbons, dimethylformamide, dimethyl sulfoxide and carbon tetrachloride. The preferred solvents are the alcohols such as methanol, ethanol, isopropanol and monoethers of ethylene glycol. Heat is required for the condensation and this is usually obtained at the reflux temperature of the solvent used. Temperatures in the range of 50° to 150° C. are suitable.

The condensation of the beta-diketone with an N-aryl cyanoacetamide is catalyzed by basic catalysts. Typical catalysts include inorganic bases, amines and quaternary ammonium hydroxides. Amine catalysts are preferred and good results have been obtained with piperidine, pyridine, diethylamine and triethylamine for example. General conditions for this type of condensation are reviewed in "Heterocyclic Compounds," edited by A. Weissberger, Interscience Publishers, 1962, in Part III on "Pyridinols and Pyridones," pages 525–531.

The 1 - aryl - 3 - cyano - pyrid - 2 - ones can also be prepared by the general method described in the above cited book "Heterocyclic Compounds" on page 596. This consists of quaternizing a 3-cyano-pyridine with an iodobenzene or naphthalene of the structure

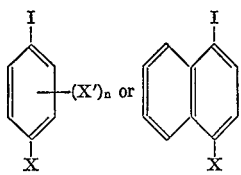

in a solvent having a high dielectric constant, such as acetonitrile, and oxidizing the resulting pyridinium salt with alkaline potassium ferricyanide to the corresponding α-pyridone. The reaction may be depicted as follows:

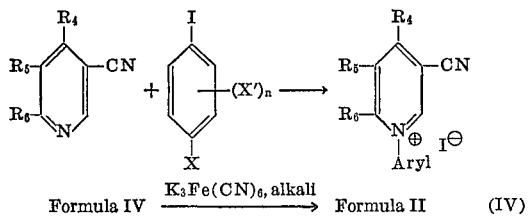

Formula IV $\xrightarrow{K_3Fe(CN)_6,\ alkali}$ Formula II    (IV)

The 1-aryl-3-cyano-4,6-dimethylpyrid-2-ones may also be prepared by a ring-closure procedure generally described in the above cited book "Heterocyclic Compounds" at pages 540–541. By this procedure acetone is condensed with a β-ketoamide of the type

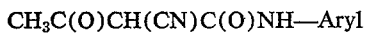

in the presence of polyphosphoric acid to give compounds of Formula II.

1-aryl-3-alkoxycarbonyl-pyrid-2-ones may be prepared from a substituted α-pyrone according to the general procedure described in the above cited book "Hetercyclic Compounds" on page 551. The reaction may be depicted for the 3-methoxycarbonyl compounds as follows:

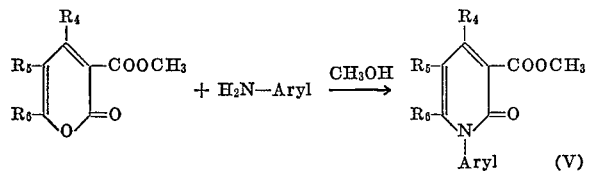

The compounds of Formula V may be converted to the corresponding carboxy compounds or their water-soluble salts by standard hydrolytic procedures.

The hydrolysis of 1-aryl-3-cyano-pyrid-2-ones may be exemplified by the following reaction sequence:

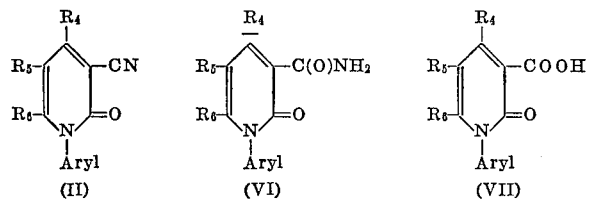

The hydrolysis of the nitrile (Formula II) proceeds to either the amide (Formula VI) or the acid (Formula VII) under acidic conditions. Aqueous organic and mineral acids are suitable for this purpose. Typical of such acids are formic, acetic, hydrochloric, sulfuric and phosphoric. The temperature requirements for the hydrolysis are such that the temperature must be high enough to allow the hydrolysis to proceed but not sufficiently high to cause decarboxylation. This is normally in the range of 50° to 150° C., with a preferred range of 80° to 120° C. The cyano compounds of Formula II can be converted to the carbamyl derivatives of Formula VI by hydrolysis with hydrogen peroxide in dilute base or by other methods known in the art. The carbamyl derivatives can be hydrolyzed to the free acids of Formula VII by means of nitrous acid or by other hydrolytic procedures well known in the chemical art.

The acids of Formula VII are readily converted to derivatives. For example, direct esterification with alcohols gives esters and reaction with halogenating agents such as oxalyl chloride, thionyl chloride or bromide and phosphorus pentachloride gives the acid halides. The acid halides can in turn be converted to esters, amides, anilides and other common derivatives by standard procedures.

The following examples are illustrative of preparations of the compounds of the invention, but are not to be construed as limitations thereof. The example numbers correspond to those given in subsequent Tables III, IV, V, VI and VII.

EXAMPLE 2

Preparation of
1-(4-chlorophenyl)-3-carboxy-4,6-dimethylpyrid-2-one (a) 1-(4-chlorophenyl) - 3 - cyano-4,6-dimethylpyrid-2-one.—A reaction mixture consisting of 19.4 g. (0.1 mole) of p-chlorophenylcyanoacetanilide, 10 g. (0.1 mole) of pentane-2,4-dione, 5 ml. of piperidine and 200 cc. of ethanol was refluxed for 3 hours. The reaction mixture was cooled to give a solid which was filtered off, washed with methanol and recrystallized from glacial acetic acid to give 22 g. of crystals. This white solid melted at 314–316° C. It was found by analysis to contain 64.96% C, 4.25% H and 10.76% N; calculated for $C_{14}H_{11}ClN_2O$ (molecular weight, 258.7) is 64.99% C, 4.29% H and 10.83% N. It is an 83% yield of 1-(4-chlorophenyl)-3-cyano 4,6-dimethylpyrid-2-one.

(b) 1 - (4-chlorophenyl)-3-carboxy-4,6-dimethylpyrid-2-one.—Forty grams (0.155 mole) of 1-(4-chlorphenyl)-3-cyano-4,6-dimethylpyrid-2-one was dissolved in a solution of 100 ml. of concentrated sulfuric acid in 60 ml. of water. The reaction mixture was heated on a steam bath over night. After cooling the product was poured into water to give a solid which was filtered off and recrystallized from ethanol. The isolated solid was 22.5 g. of white solid which melted at 215–217° C. This was found to contain by analysis 60.60% C, 4.27% H and 5.10% N; calculated for $C_{14}H_{12}ClNO_3$ (molecular weight, 277.7) is 60.55% C, 4.36% H and 5.05% N. The product is a 52% yield of 1-(4-chlorophenyl)-3-carboxy-4,6-dimethylpyrid-2-one.

EXAMPLE 19

Preparation of
1-(4-chlorophenyl)-3-carbamyl-4,6-dimethylpyrid-2-one

A reaction mixture consisting of 777 g. (3 moles) of 1-(4-chlorophenyl) - 3 - cyano - 4,6 - dimethylpyrid-2-one, 1940 ml. of concentrated sulfuric acid and 1164 ml. of water was heated on a steam bath at 90–95° C. for 15 hours. The cooled mixture was poured into 7 l. of water and resulting solid was filtered off. The solid was treated with 1600 g. of 25% aqueous sodium hydroxide, filtered and the solid residue treated with 2200 g. of 10% aqueous sodium hydroxide with stirring for 4 hours at room temperature. The product was filtered and from the filtrate there was isolated 326 g. (a 39% yield) of 1-(4-chlorophenyl)-3-carboxy-4,6-dimethylpyrid-2-one. The insoluble residue, which was 257 g. of solid melting at 206–212° C., was washed with 1000 g. of 10% aqueous sodium hydroxide, then with water, filtered and the residue dried to give 250 g. of almost white solid melting at 211–213° C. By NMR this was shown to be essentially 1-(4-chlorophenyl)-3-carbamyl-4,6-dimethylpyrid-2-one and as such is a 30% yield. A sample of the solid was recrystallized from a 50:50 mixture of acetone-methanol to give the product as a white crystalline solid melting at 222–226° C. This solid was found to contain by analysis 61.71% C, 4.76% H, 12.65% Cl, 10.01% N and 11.39% O; calculated for $C_{14}H_{13}ClN_2O_2$ (molecular weight, 276.7) 60.76% C, 4.73% H, 12.82% Cl, 10.13% N and 11.56% O.

EXAMPLE 32

Preparation of the sodium salt of 1-(3,4-dichlorphenyl)-3-carboxy-4,6-dimethylpyrid-2-one To a solution of 177.5 g. of 50.2% aqueous sodium hydroxide (2.2 moles) in 3800 g. of deionized water was added 722 g. of 96% 1-(3,4-dichlorophenyl)-3-carboxy-4,6-dimethylpyrid-2-one (2.22 moles). This was stirred until solution resulted. The solution was poured onto trays and the water allowed to evaporate to give a solid which was then dried in a forced-draft oven at about 50° C. for 4 hours. There was obtained 872 g. of a dry tan-colored powder which melted with decomposition at 244° C. Analysis showed it to contain 17.5% water. Mass spectrographic analysis indicated homogenity. The product was recrystallized from water. Titration with 0.5 N hydrochloric acid showed it to be 96% pure. It melted at 253–255° C. The product is a quantitative yield of the sodium salt of 1-(3,4-dichlorophenyl)-3-carboxy-4,6-dimethylpyrid-2-one.

The sodium salt of 1-(4-chlorophenyl)-3-carboxy-4,6-dimethylpyrid-2-one (Example 30) was prepared in the same way. The recrystallized solid was found to be 95.7% pure by titration and melted at 270–272° C.

EXAMPLE 35

Preparation of 1-(4-chlorophenyl)-3-methoxycarbonyl-4,6-dimethylpyrid-2-one

A reaction mixture consisting of 10 g. (0.036 mole) of 1-(4-chlorophenyl)-3-carboxy - 4,6 - dimethylpyrid-2-one, 100 ml. of methanol and 1 ml. of concentrated hydrochloric acid was stirred at reflux temperature for about 16 hours. It was cooled to 10° C. to give a white solid which was filtered off, washed with cold methanol and dried. The product was 8 g. of a light tan crystalline solid melting at 188–189° C. Infrared spectroscopy confirmed that the product was exclusively an ester. The solid was found to contain by analysis 61.71% C, 4.70% H, 12.58% Cl, 4.70% N and 16.44% O; calculated for $C_{15}H_{14}ClNO_3$ is 61.75% C, 4.84% H, 12.17% Cl, 4.80% N and 16.44% O. The product is a 76% yield of 1-(4-chlorophenyl)-3-methoxycarbonyl - 4,6 - dimethylpyrid-2-one.

TABLE I

Preparations of N-aryl cyanoacetamides, $NCCH_2C(O)NH—Aryl$

| Preparation: | Melting point (° C.) |
|---|---|
| 4'-bromo-2-cyanoacetanilide | 198–200 |
| 4'-chloro-2-cyanoacetanilide | 201–203 |
| 4'-fluoro-2-cyanoacetanilide | 184–186 |
| 4'-iodo-2-cyanoacetanilide | 207–209 |
| 4'-methyl-2-cyanoacetanilide | 186–187 |
| 4'-trifluoromethyl-2-cyanoacetanilide | 190–192 |
| 4'-isopropyl-2-cyanoacetanilide | 170–172 |
| 4'-methoxy-2-cyanoacetanilide | 134–135 |
| 4'-nitro-2-cyanoacetanilide | 198–202 |
| 3'-fluoro-2-cyanoacetanilide | 163–165 |
| 3'-chloro-2-cyanoacetanilide | 131–134 |
| 2',4'-dichloro-2-cyanoacetanilide | 118–123 |
| 3',4'-dichloro-2-cyanoacetanilide | 161–164 |
| 3'-fluoro-4'-methyl-2-cyanoacetanilide | 178–180 |
| 3'-chloro-4'-methyl-2-cyanoacetanilide | 149–151 |
| 3'-methyl-4'-chloro-2-cyanoacetanilide | 146–149 |
| 3'-trifluoromethyl - 4' - chloro - 2 - cyanoacetanilide | 131–133 |
| 3',4'dimethyl-2-cyanoacetanilide | 138–140 |
| 2',4',5'-trichloro-2-cyanoacetanilide | 186–188 |
| 2',4',6-trichloro-2-cyanoacetanilide | 207–210 |
| 2'-fluoro-3',4'-dichloro-2-cyanoacetanilide | 183–185 |
| 2',4',5'-trimethyl-2-cyanoacetanilide | 184–186 |
| 2',4',6-trimethyl-2-cyanoacetanilide | 207–209 |
| N-(4-chloronaphthyl)-2-cyanoacetanilide | 279–280 |

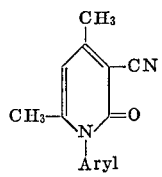

TABLE II.—PREPARATIONS OF 1-ARYL-3-CYANO-4,6-DIMETHYLPYRID-2-ONES

| Preparation | Melting point (° C.) | Empirical formula | Element | Analysis, percent Found | Analysis, percent Calc'd |
|---|---|---|---|---|---|
| 1-(4-bromophenyl)-3-cyano-4,6-dimethylpyrid-2-one | >300 | $C_{14}H_{11}BrN_2O$ | C | 55.05 | 55.45 |
| | | | H | 3.62 | 3.66 |
| | | | Br | 26.58 | 26.38 |
| | | | N | 8.78 | 9.23 |
| | | | O | 5.72 | 5.28 |
| 1-(4-chlorophenyl)-3-cyano-4,6-dimethylpyrid-2-one | 314–316 | $C_{14}H_{11}ClN_2O$ | | | |
| 1-(4-fluorophenyl)-3-cyano-4,6-dimethylpyrid-2-one | 272–274 | $C_{14}H_{11}FN_2O$ | C | 69.50 | 69.40 |
| | | | H | 4.68 | 4.58 |
| | | | F | 7.65 | 7.85 |
| | | | N | 11.27 | 11.57 |
| 1-(4-iodophenyl)-3-cyano-4,6-dimethylpyrid-2-one | >300 | $C_{14}H_{11}IN_2O$ | C | 47.83 | 48.02 |
| | | | H | 3.41 | 3.17 |
| | | | I | 36.41 | 36.24 |
| | | | N | 7.66 | 8.00 |
| | | | O | 7.66 | 4.57 |
| 1-(4-methylphenyl)-3-cyano-4,6-dimethylpyrid-2-one | 274–276 | $C_{15}H_{14}N_2O$ | C | 75.35 | 75.66 |
| | | | H | 5.77 | 5.92 |
| | | | N | 11.71 | 11.75 |
| | | | O | 7.21 | 6.72 |

TABLE II—Continued

| Preparation | Melting point (°C.) | Empirical formula | Element | Found | Calc'd |
|---|---|---|---|---|---|
| 1-(4-trifluoromethylphenyl)-3-cyano-4,6-dimethylpyrid-2-one | 180–182 | $C_{15}H_{11}F_3N_2O$ | C<br>H<br>N<br>F | 61.25<br>3.98<br>9.43<br>18.96 | 61.65<br>3.78<br>9.58<br>19.51 |
| 1-(4-isopropylphenyl)-3-cyano-4,6-dimethylpyrid-2-one | 261–263 | $C_{17}H_{18}N_2O$ | C<br>H<br>N<br>O | 76.99<br>6.88<br>10.36<br>6.17 | 76.65<br>6.82<br>10.51<br>6.02 |
| 1-(4-methoxyphenyl)-3-cyano-4,6-dimethylpyrid-2-one | 247–249 | $C_{15}H_{14}N_2O_2$ | C<br>H<br>N<br>O | 70.90<br>5.42<br>11.15<br>12.77 | 70.85<br>5.55<br>11.02<br>12.58 |
| 1-(4-nitrophenyl)-3-cyano-4,6-dimethylpyrid-2-one | 278–281 | $C_{14}H_{11}N_3O_3$ | C<br>H<br>N<br>O | 62.42<br>4.03<br>15.91<br>17.59 | 62.49<br>4.12<br>15.53<br>17.84 |
| 1-(3-fluorophenyl)-3-cyano-4,6-dimethylpyrid-2-one | 287–289 | $C_{14}H_{11}FN_3O$ | C<br>H<br>N | 69.63<br>4.76<br>11.70 | 69.40<br>4.58<br>11.57 |
| 1-(3-chlorophenyl)-3-cyano-4,6-dimethylpyrid-2-one | 249–250 | $C_{14}H_{11}ClN_2O$ | C<br>H<br>Cl<br>N<br>O | 64.96<br>4.18<br>13.50<br>10.76<br>6.58 | 65.00<br>4.28<br>13.70<br>10.82<br>6.20 |
| 1-(2,4-dichlorophenyl)-3-cyano-4,6-dimethylpyrid-2-one | 222–224 | $C_{14}H_{10}Cl_2N_2O$ | C<br>H<br>Cl<br>N<br>O | 57.16<br>3.67<br>24.21<br>9.76<br>6.36 | 57.40<br>3.44<br>24.20<br>9.55<br>5.47 |
| 1-(3,4-dichlorophenyl)-3-cyano-4,6-dimethylpyrid-2-one | 278–279 | $C_{14}H_{10}Cl_2N_2O$ | C<br>H<br>Cl<br>N<br>O | 57.35<br>3.50<br>23.70<br>9.46<br>5.75 | 57.40<br>3.44<br>24.20<br>9.55<br>5.47 |
| 1-(3-fluoro-4-methylphenyl)-3-cyano-4,6-dimethylpyrid-2-one | 306–308 | $C_{15}H_{10}FN_2O$ | C<br>H<br>N | 71.19<br>4.24<br>11.13 | 71.20<br>3.97<br>11.07 |
| 1-(3-chloro-4-methylphenyl)-3-cyano-4,6-dimethylpyrid-2-one | 259–260 | $C_{15}H_{13}ClN_2O$ | C<br>H<br>Cl<br>N<br>O | 66.14<br>4.97<br>13.09<br>10.24<br>6.43 | 66.06<br>4.81<br>13.00<br>10.27<br>5.86 |
| 1-(3,4-dimethylphenyl)-3-cyano-4,6-dimethylpyrid-2-one | 255–257 | $C_{16}H_{16}N_2O$ | C<br>H<br>N<br>O | 76.33<br>6.40<br>11.23<br>6.64 | 76.20<br>6.39<br>11.11<br>6.34 |
| 1-(3-methyl-4-chlorophenyl)-3-cyano-4,6-dimethylpyrid-2-one | 235–236 | $C_{15}H_{13}ClN_2O$ | C<br>H<br>Cl<br>N<br>O | 66.09<br>4.88<br>12.91<br>10.13<br>6.12 | 66.06<br>4.81<br>13.00<br>10.27<br>5.86 |
| 1-(3-trifluoromethyl-4-chlorophenyl)-3-cyano-4,6-dimethylpyrid-2-one | 261–263 | $C_{15}H_{10}ClF_3N_2O$ | C<br>H<br>Cl<br>N | 55.31<br>3.23<br>10.38<br>8.33 | 55.15<br>3.08<br>10.85<br>8.57 |
| 1-(2,4,5-trichlorophenyl)-3-cyano-4,6-dimethylpyrid-2-one | 240–243 | $C_{14}H_9Cl_3N_2O$ | C<br>H<br>Cl<br>N<br>O | 50.72<br>2.87<br>32.18<br>8.78<br>5.25 | 51.30<br>2.77<br>32.50<br>8.55<br>4.88 |
| 1-(2,4,6-trichlorophenyl)-3-cyano-4,6-dimethylpyrid-2-one | 243–245 | $C_{14}H_9Cl_3N_2O$ | C<br>H<br>Cl<br>N<br>O | 51.02<br>2.66<br>31.90<br>8.20<br>5.29 | 51.30<br>2.77<br>32.50<br>8.55<br>4.88 |
| (2-fluoro-3,4-dichlorphenyl)-3-cyano-4,6-dimethypyrid-2-one | 250–252 | $C_{14}H_9Cl_2FN_2O$ | C<br>H<br>Cl<br>F<br>N | 54.33<br>3.32<br>22.92<br>6.45<br>8.83 | 54.00<br>2.92<br>22.80<br>6.12<br>9.00 |
| 1-(2,4,5-trimethylphenyl)-3-cyano-4,6-dimethylpyrid-2-one | 214–217 | $C_{17}H_{18}N_2O$ | C<br>H<br>N<br>O | 77.00<br>6.82<br>10.31<br>6.24 | 76.70<br>6.80<br>10.50<br>6.00 |
| 1-(2,4,6-trimethylphenyl)-3-cyano-4,6-dimethylpyrid-2-one | 244–246 | $C_{17}H_{18}N_2O$ | C<br>H<br>N<br>O | 67.40<br>6.84<br>10.50<br>6.39 | 76.70<br>6.80<br>10.50<br>6.00 |
| 1-(4-chloronaphthyl)-3-cyano-4,6-dimethylpyrid-2-one | 275 | $C_{18}H_{13}ClN_2O$ | C<br>H<br>Cl<br>N<br>O | 67.76<br>3.94<br>13.58<br>8.72<br>5.71 | 70.00<br>4.25<br>11.50<br>9.06<br>5.19 |
| 1-(4-chlorophenyl)-3-cyano-4,5,6-trimethylpyrid-2-one | 197–200 | $C_{15}H_{13}Cl_2O$ | C<br>H<br>Cl<br>N<br>O | 66.20<br>4.90<br>12.65<br>10.26<br>5.82 | 66.10<br>4.80<br>13.00<br>10.25<br>5.85 |
| 1-(4-chlorophenyl)-3-cyano-4,6-diethylpyrid-2-one | 161–162 | $C_{16}H_{15}ClN_2O$ | C<br>H<br>Cl<br>N<br>O | 67.21<br>5.34<br>12.22<br>9.90<br>5.65 | 67.05<br>5.27<br>12.36<br>9.75<br>5.57 |
| 1-(4-chlorophenyl)-3-cyano-5-chloro-4,6-dimethylpyrid-2-one | 168–170 | $C_{14}H_{10}Cl_2N_2O$ | C<br>H<br>Cl<br>N<br>O | 56.76<br>4.03<br>22.96<br>8.90<br>7.67 | 57.35<br>3.44<br>24.20<br>9.55<br>5.46 |

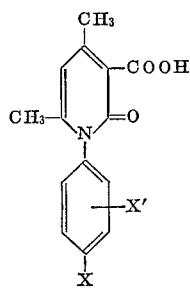

TABLE III.—EXAMPLES OF 1-ARYL-3-CARBOXY-4,6-DIMETHYLPYRID 2-ONES

| Example | X | X' | Melting point (°C.) | Empirical formula | Element | Analysis, percent Found | Analysis, percent Calc'd |
|---|---|---|---|---|---|---|---|
| 1 | Br | H | 238–239 | $C_{14}H_{12}BrNO_3$ | C<br>H<br>Br<br>N<br>O | 52.16<br>4.02<br>24.51<br>4.17<br>14.99 | 52.15<br>3.76<br>24.86<br>4.35<br>14.92 |
| 2 | Cl | H | 215–127 | $C_{14}H_{12}ClNO_3$ | | | |
| 3 | F | H | 158–160 | $C_{14}H_{12}FNO_3$ | C<br>H<br>F<br>N | 64.80<br>4.67<br>7.10<br>5.42 | 64.36<br>4.63<br>7.27<br>5.36 |
| 4 | I | H | 259–261 | $C_{14}H_{12}INO_3$ | C<br>H<br>I<br>N<br>O | 45.42<br>3.11<br>34.61<br>3.63<br>13.23 | 45.50<br>3.28<br>34.40<br>3.80<br>13.02 |
| 5 | $CH_3$ | H | 183–185 | $C_{15}H_{15}NO_3$ | C<br>H<br>N<br>O | 70.26<br>5.94<br>5.64<br>18.68 | 70.05<br>5.88<br>5.45<br>18.68 |
| 6 | $CF_3$ | H | 205–207 | $C_{15}H_{12}F_3NO_3$ | C<br>H<br>F<br>N | 58.15<br>3.98<br>18.24<br>4.50 | 57.85<br>3.89<br>18.31<br>4.50 |
| 7 | iso $C_3H_7$ | H | 209–211 | $C_{17}H_{19}NO_3$ | C<br>H<br>N<br>O | 71.70<br>6.70<br>4.93<br>16.57 | 71.60<br>6.73<br>4.82<br>16.85 |
| 8 | $CH_3O$ | H | 217–220 | $C_{15}H_{15}NO_4$ | C<br>H<br>N<br>O | 66.27<br>5.63<br>5.33<br>23.25 | 66.00<br>5.34<br>5.13<br>23.45 |
| 9 | $NO_2$ | H | 237–240 | $C_{14}H_{12}N_3O_5$ | C<br>H<br>N<br>O | 57.16<br>4.20<br>11.03<br>25.43 | 58.33<br>4.19<br>9.72<br>27.75 |
| 10 | H | 3-F | 239–240 | $C_{14}H_{12}FNO_3$ | C<br>H<br>F<br>N | 64.46<br>5.00<br>7.29<br>5.35 | 64.36<br>4.63<br>7.27<br>5.36 |
| 11 | H | 3-Cl | 226–228 | $C_{14}H_{12}ClNO_3$ | C<br>H<br>Cl<br>N<br>O | 60.49<br>4.39<br>13.03<br>5.05<br>17.58 | 60.55<br>4.35<br>12.77<br>5.04<br>17.28 |
| 12 | Cl | 2-Cl | 153–155 | $C_{14}H_{11}Cl_2NO_3$ | C<br>H<br>Cl<br>N<br>O | 54.35<br>3.87<br>22.23<br>4.95<br>13.75 | 53.85<br>3.55<br>22.72<br>4.48<br>15.40 |
| 13 | Cl | 3-Cl | 240–242 | $C_{14}H_{11}Cl_2NO_3$ | C<br>H<br>Cl<br>N<br>O | 52.47<br>3.70<br>21.68<br>4.51<br>15.38 | 53.85<br>3.55<br>22.72<br>4.48<br>15.40 |
| 14 | $CH_3$ | 3-F | 233–234 | $C_{15}H_{14}FNO_3$ | C<br>H<br>F<br>N | 65.57<br>5.30<br>6.87<br>5.15 | 65.45<br>5.13<br>6.90<br>5.09 |
| 15 | $CH_3$ | 3-Cl | 229–231 | $C_{15}H_{14}ClNO_3$ | C<br>H<br>Cl<br>N<br>O | 61.45<br>4.66<br>12.44<br>4.83<br>16.05 | 61.75<br>4.83<br>12.15<br>4.80<br>16.45 |
| 16 | $CH_3$ | 3-$CH_3$ | 208–210 | $C_{16}H_{17}NO_3$ | C<br>H<br>N<br>O | 70.81<br>6.49<br>5.28<br>17.54 | 70.85<br>6.32<br>5.17<br>17.22 |
| 17 | Cl | 3-$CH_3$ | 215–217 | $C_{15}H_{14}ClNO_3$ | C<br>H<br>Cl<br>N<br>O | 61.97<br>4.83<br>12.48<br>4.91<br>16.80 | 61.75<br>4.85<br>12.15<br>4.80<br>16.45 |
| 18 | Cl | 3-$CF_3$ | 254–256 | $C_{15}H_{11}ClF_3NO_3$ | C<br>H<br>Cl<br>F<br>N | 51.81<br>3.07<br>10.33<br>16.20<br>3.87 | 52.10<br>3.20<br>10.25<br>16.50<br>4.05 |

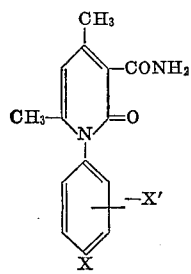

TABLE IV.—EXAMPLES OF 1-ARYL-3-CARBAMYL-4,6-DIMETHYLPYRID-2-ONES

| Example | X | X' | Melting point (°C.) | Empirical formula | Element | Found | Calc'd |
|---|---|---|---|---|---|---|---|
| 19 | Cl | H | 222–226 | $C_{14}H_{13}ClN_2O_2$ | | | |
| 20 | F | H | 210–212 | $C_{14}H_{13}FN_2O_2$ | C | 65.87 | 64.58 |
| | | | | | H | 4.95 | 5.03 |
| | | | | | F | 7.15 | 7.30 |
| | | | | | N | 10.64 | 10.76 |
| 21 | I | H | 225–231 | $C_{14}H_{13}IN_2O_2$ | C | 46.06 | 45.70 |
| | | | | | H | 3.91 | 3.56 |
| | | | | | I | 35.91 | 34.45 |
| | | | | | N | 6.65 | 7.60 |
| | | | | | O | 8.12 | 8.69 |
| 22 | $CH_3$ | H | 225–229 | $C_{15}H_{16}N_2O_2$ | C | 70.62 | 70.35 |
| | | | | | H | 6.36 | 6.30 |
| | | | | | N | 10.10 | 10.93 |
| | | | | | O | 13.51 | 12.50 |
| 23 | $NO_2$ | H | 210–212 | $C_{14}H_{13}N_3O_4$ | C | 56.82 | 58.53 |
| | | | | | H | 4.48 | 4.56 |
| | | | | | N | 14.04 | 14.63 |
| | | | | | O | 22.33 | 22.29 |
| 24 | H | 3-F | [1] 212–222 | $C_{14}H_{13}FN_2O_2$ | C | 64.66 | 64.58 |
| | | | | | H | 5.00 | 5.03 |
| | | | | | F | 7.24 | 7.30 |
| | | | | | N | 10.76 | 10.76 |
| 25 | H | 3-Cl | 207–220 | $C_{14}H_{13}ClN_2O_2$ | C | 60.90 | 60.76 |
| | | | | | H | 4.76 | 4.74 |
| | | | | | Cl | 13.26 | 12.81 |
| | | | | | N | 9.83 | 10.21 |
| | | | | | O | 11.20 | 11.56 |
| 26 | Cl | 2-Cl | 197–199 | $C_{14}H_{12}Cl_2N_2O_2$ | C | 55.02 | 54.04 |
| | | | | | H | 4.00 | 3.89 |
| | | | | | Cl | 22.70 | 22.79 |
| | | | | | N | 7.59 | 9.00 |
| | | | | | O | 10.16 | 10.28 |
| 27 | Cl | 3-$CH_3$ | 254–260 | $C_{15}H_{15}ClN_2O_2$ | C | 62.49 | 62.00 |
| | | | | | H | 5.32 | 5.20 |
| | | | | | Cl | 12.43 | 12.20 |
| | | | | | N | 8.41 | 9.63 |
| | | | | | O | 10.95 | 11.02 |
| 28 | $CH_3$ | 3-F | 219–221 | $C_{15}H_{15}FN_2O_2$ | C | 65.77 | 65.68 |
| | | | | | H | 5.55 | 5.51 |
| | | | | | F | 6.84 | 6.93 |
| | | | | | N | 10.10 | 10.21 |
| 29 | $CH_3$ | 3-$CH_3$ | 243–245 | $C_{16}H_{18}N_2O_2$ | C | 71.20 | 71.00 |
| | | | | | H | 6.60 | 6.73 |
| | | | | | N | 9.90 | 10.38 |
| | | | | | O | 12.19 | 11.86 |

[1] Decomposition.

TABLE V.—EXAMPLES OF DERIVATIVES OF 1-ARYL-3-CARBOXY-4,6-DIMETHYLPYRID-2-ONES

Example:
30...... Sodium salt of 1-(4-chlorophenyl)-3-carboxy-4,6-dimethylpyrid-2-one.
31...... Cupric salt of 1-(4-chlorophenyl)-3-carboxy-4,6-dimethylpyrid-2-one (melting point 205–210° C. dec.).
32...... Sodium salt of 1-(3,4-dichlorophenyl)-3-carboxy-4,6-dimethylpyrid-2-one.
33...... Dimethylamine salt of 1-(4-chlorophenyl)-3-carboxy-4,6-dimethylpyrid-2-one.
34...... Dimethylamine salt of 1-(3,4-dichlorophenyl)-3-carboxy-4,6-dimethylpyrid-2-one.
35...... 1-(4-chlorophenyl)-3-methoxycarbonyl-4,6-dimethylpyrid-2-one.
36...... 1-(4-chlorophenyl)-3-isopropoxycarbonyl-4,6-dimethylpyrid-2-one (melting point=130–133° C.).
37...... 1-(4-chlorophenyl)-3-chloroformyl-4,6-dimethylpyrid-2-one (melting point=130–135° C.).

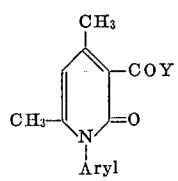

EXAMPLES OF 1-(TRISUBSTITUTED-ARYL)-3-CARBOXY (OR 3-CARBAMYL)-4,6-DIMETHYLPYRID-2-ONES

| Aryl | Y | Melting point (°C.) | Empirical formula | Element | Analysis, percent Found | Analysis, percent Cal'd |
|---|---|---|---|---|---|---|
| Example: | | | | | | |
| 38 .......... 2,4,5-trichlorophenyl | OH | 208–211 | $C_{14}H_{10}Cl_3NO_3$ | C | 48.33 | 48.50 |
| | | | | H | 3.09 | 2.91 |
| | | | | Cl | 30.37 | 30.70 |
| | | | | N | 4.09 | 4.04 |
| | | | | O | 13.35 | 13.85 |
| 39 .......... 2,4,5-trichlorophenyl | $NH_2$ | 207–214 | $C_{14}H_{11}Cl_3N_2O_2$ | C | 47.53 | 48.70 |
| | | | | H | 2.91 | 3.20 |
| | | | | Cl | 33.64 | 30.80 |
| | | | | N | 6.09 | 8.11 |
| | | | | O | 8.03 | 9.27 |
| 40 .......... 2,4,6-trichlorophenyl | OH | 158–160 | $C_{14}H_{10}Cl_3NO_3$ | C | 48.21 | 48.50 |
| | | | | H | 2.87 | 2.90 |
| | | | | Cl | 30.64 | 30.70 |
| | | | | N | 4.19 | 4.05 |
| | | | | O | 13.62 | 13.85 |
| 41 .......... 2-fluoro-3,4-dichlorophenyl | OH | 214–216 | $C_{14}H_{10}Cl_2FNO_3$ | C | 51.06 | 50.95 |
| | | | | H | 2.97 | 3.05 |
| | | | | Cl | 21.43 | 21.45 |
| | | | | F | 5.75 | 5.75 |
| | | | | N | 4.21 | 4.25 |
| 42 .......... 2,4,5-trimethylphenyl | OH | 158–160 | $C_{17}H_{19}NO_3$ | C | 71.77 | 71.55 |
| | | | | H | 6.72 | 6.72 |
| | | | | N | 4.93 | 4.91 |
| | | | | O | 16.45 | 16.82 |
| 43 .......... 2,4,6-trimethylphenyl | OH | 198–205 | $C_{17}H_{19}NO_3$ | C | 72.01 | 71.60 |
| | | | | H | 6.78 | 6.71 |
| | | | | N | 5.21 | 4.91 |
| | | | | O | 14.59 | 16.82 |
| 44 .......... 2,4,6-trimethylphenyl | $NH_2$ | 204–210 | $C_{17}H_{20}N_2O_2$ | C | 72.51 | 71.80 |
| | | | | H | 7.26 | 7.08 |
| | | | | N | 9.40 | 9.85 |
| | | | | O | 10.55 | 11.27 |
| 45 .......... 4-chloronaphthyl | OH | 221–223 | $C_{18}H_{14}ClNO_3$ | C | 62.63 | 65.90 |
| | | | | H | 3.81 | 4.32 |
| | | | | Cl | 10.74 | 10.83 |
| | | | | N | 4.38 | 4.28 |
| | | | | O | 15.50 | 14.67 |

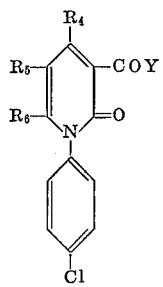

TABLE VII.—EXAMPLES OF 1-ARYL-3-CARBOXY (OR 3-CARBAMYL)-DI(TRI)SUBSTITUTED-PYRID-2-ONES

| | $R_4$ | $R_5$ | $R_6$ | Y | Melting point (°C.) | Empirical formula | Element | Analysis, percent Found | Analysis, percent Calc'd |
|---|---|---|---|---|---|---|---|---|---|
| Example: | | | | | | | | | |
| 46 .............. | $CH_3$ | $CH_3$ | $CH_3$ | OH | 168–173 | $C_{15}H_{14}ClNO_3$ | C | 62.53 | 61.80 |
| | | | | | | | H | 4.89 | 4.84 |
| | | | | | | | Cl | 12.05 | 12.17 |
| | | | | | | | N | 5.08 | 4.81 |
| | | | | | | | O | 15.05 | 16.48 |
| 47 .............. | $CH_3$ | $CH_3$ | $CH_3$ | $NH_2$ | 213–215 | $C_{15}H_{15}ClN_2O_2$ | C | 60.87 | 61.90 |
| | | | | | | | H | 5.05 | 5.20 |
| | | | | | | | Cl | 11.60 | 12.18 |
| | | | | | | | N | 9.29 | 9.62 |
| | | | | | | | O | 12.88 | 11.00 |
| 48 .............. | $C_2H_5$ | H | $C_2H_5$ | OH | 126–127 | $C_{16}H_{16}ClNO_3$ | C | 62.92 | 62.85 |
| | | | | | | | H | 5.41 | 5.27 |
| | | | | | | | Cl | 11.61 | 11.60 |
| | | | | | | | N | 4.81 | 4.58 |
| | | | | | | | O | 15.54 | 15.70 |
| 49 .............. | $CH_3$ | Cl | $CH_3$ | OH | 176–178 | $C_{14}H_{11}Cl_2NO_3$ | C | 53.89 | 53.84 |
| | | | | | | | H | 3.54 | 3.55 |
| | | | | | | | Cl | 22.60 | 22.75 |
| | | | | | | | N | 4.97 | 4.48 |
| | | | | | | | O | 15.04 | 15.38 |

The compounds of this invention have been found to produce a variety of plant responses. These responses are observed when the compounds alone or in a carrier or as formulations are applied to the plant itself, as by foliar application, or to plant parts such as by seed treatment or to the environment or habitat of the plant, such as by soil drenching or soil incorporation. The most outstanding plant-growth influencing property is suppression of growth. This is most commonly found to be a growth inhibitory action on the stem, i.e., stem elongation is inhibited. In other instances flowering or seed formation is altered. In other cases malformation of leaves is noted. Sometimes, particularly at high dosages, a plant species may be herbicidally sensitive.

Preemergence herbicidal activity has also been obtained. Individual plant species give different types of responses and any one or several of these plant responses may be observed for any given species. The major contribution of the compounds of this invention to the field of plant growth regulation is that they provide non-injurious plant growth regulants which inhibit stem elongation of many weed, crop and woody species and alter flowering and fruit development.

A soil drench test was used as one method for evaluating the plant growth regulating properties of the compounds of this invention. In this test, seeds or plants were planted in pots and at a given stage of growth the soil was watered with a preparation containing the compound at given dosages in terms of pounds per acre. Growth responses were subsequently observed.

In one such test about 20 wheat seeds were planted in a 4 inch pot and allowed to grow for 11 days, at which time the second leaf of wheat was emerging. A solution or suspension of the chemical was prepared by dissolving the compound in about 1 ml. of acetone or water and adding sufficient water to make 50 ml. The amount of chemical was such as to provide 2 and 20 pounds per acre. For example 2 mg. give 2 lbs./a. or 2.2 kilos per hectare. Each test was run in triplicate and untreated plants were included as controls. Four weeks after treatment the overall height of the plants from the soil level to the leaf tip was measured. The percent inhibition was calculated as $$\text{Percent inhibition} = 100 - 100 \times \frac{\text{height of treated plant}}{\text{height of control plant}}$$

The following Table VIII gives the results.

TABLE VIII.—INHIBITION OF WHEAT PLANTS BY SOIL DRENCH

| | Percent inhibition at— | |
|---|---|---|
| | 2 lbs./a. | 20 lbs./a. |
| Example: | | |
| 1 | 52 | 82 |
| 2 | 53 | 71 |
| 3 | 15 | 41 |
| 4 | 44 | 74 |
| 5 | 18 | 52 |
| 6 | 43 | 63 |
| 7 | 0 | 15 |
| 8 | 20 | 27 |
| 9 | 6 | 25 |
| 10 | 0 | 17 |
| 11 | 0 | 24 |
| 12 | 31 | 62 |
| 13 | 46 | 80 |
| 14 | 34 | 58 |
| 15 | 31 | 60 |
| 16 | 20 | 57 |
| 17 | 61 | 84 |
| 18 | 48 | 73 |
| 19 | 20 | 52 |
| 20 | 0 | 0 |
| 21 | 10 | 15 |
| 22 | 0 | 30 |
| 23 | 0 | 13 |
| 24 | 0 | 0 |
| 25 | 0 | 0 |
| 26 | 6 | 37 |
| 27 | 0 | 7 |
| 28 | 0 | 24 |
| 29 | 0 | 30 |
| 30 | 59 | 67 |
| 31 | ¹34 | ¹50 |
| 32 | 60 | 74 |
| 33 | 60 | 67 |

TABLE VIII—Continued

| | Percent inhibition at— | |
|---|---|---|
| | 2 lbs./a. | 20 lbs./a. |
| Example: | | |
| 34 | 63 | 71 |
| 35 | 17 | 52 |
| 36 | 0 | 34 |
| 37 | 49 | 64 |
| 38 | 41 | 57 |
| 39 | 70 | 29 |
| 40 | 0 | 21 |
| 41 | 41 | 56 |
| 42 | 16 | 52 |
| 43 | 6 | 40 |
| 44 | 0 | 9 |
| 45 | ¹47 | ¹58 |
| 46 | 59 | 67 |
| 47 | 21 | 47 |
| 48 | ¹18 | ¹39 |
| 49 | ¹34 | ¹47 |

¹ Data approximately two weeks after treatment.

In this type of test the following compounds gave no inhibition of wheat plants, i.e. the plants were similar to untreated controls.

1-phenyl-3-carboxy-4,6-dimethylpyrid-2-one
1-phenyl-3-carbamyl-4,6-dimethylpyrid-2-one
1-(2-chlorophenyl)-3-carboxy-4,6-dimethylpyrid-2-one
1-(4-chlorphenyl)-3-cyano-4,6-dimethlypyrid-2-one
1-(3,4-dichlorphenyl)-3-cyano-4,6-dimethylpyrid-2-one For foliage spray tests, the compounds were dissolved in an appropriate solvent, usually acetone for the amides, acids and esters and water for the salts and sprayed onto the foliage at a given dosage per acre in a carrier volume of about 50 gallons per acre. Growth responses were subsequently observed. In one such test the compounds of Examples 2, 30 and 33 were compared, using eleven-day old potted wheat plants. The compounds were prepared for testing as follows:

(a) Example 2.—One-half gram of 1-(4-chlorophenyl)-3-carboxy-4,6-dimethylpyrid-2-one was dissolved in 100 ml. of acetone.

(b) Example 30.—One-half gram of 1-(4-chlorophenyl)-3-carboxy-4,6-dimethylpyrid-2-one (1.8 millimoles) was dissolved in 18 ml. of 0.1 N sodium hydroxide and the solution diluted with water to a volume of 100 ml.

(c) Example 33.—One-half gram of 1-(4-chlorophenyl)-3-carboxy-4,6-dimethylpyrid-2-one (1.8 millimoles) was dissolved in 15.3 ml. of 0.1177 N dimethylamine solution and the solution diluted to a volume of 100 ml.

The above solutions were sprayed onto the potted plants, using a calibrated sprayer at such a rate as to deliver 2 lbs. per acre. The solutions were appropriately diluted for lower rates. Two months after treatment the percent inhibition as compared to control plants was measured. Table IX gives the results:

TABLE IX.—INHIBITION OF WHEAT PLANTS BY FOLIAR APPLICATION

| | Percent inhibition at— | | |
|---|---|---|---|
| | 0.5 lb./a. | 1 lb./a. | 2 lbs./a. |
| Example: | | | |
| 2 | 21 | 40 | 56 |
| 30 | 23 | 48 | 56 |
| 33 | 30 | 54 | 56 |

In seed treatment tests an aqueous solution or suspension of the test compound was prepared and diluted to various percent concentrations. Seeds were then immersed in these preparations for about 20 hours, after which they were washed with water, planted in untreated soil, and the germination and growth subsequently observed.

In one such greenhouse test the sodium salt of 1-(4-chlorophenyl) - 3 - carboxy-4,6-dimethylpyrid-2-one (Example 30) was dissolved in water to give a series of concentrations varying from 0.03% to 3%. Seeds of barley, oats and wheat were treated with these solutions as indicated above and planted. Four weeks after planting the percent inhibition was determined. A 100% inhibition indicates that the seeds did not germinate or that no plants appeared. Table X gives the results:

TABLE X.—INHIBITION OF CEREALS BY SEED TREATMENT

| Percent concentration | Percent inhibition at— | | | | |
|---|---|---|---|---|---|
| | 0.03 | 0.1 | 0.3 | 1 | 3 |
| Plant Species: | | | | | |
| Barley | 16 | 21 | 42 | 100 | 100 |
| Oats | 7 | 7 | 23 | 30 | 37 |
| Wheat | 6 | 18 | 24 | 29 | 100 |

Table XI gives plant responses obtained with 1-(4-chlorophenyl)-3-carboxy-4,6-dimethylpyrid-2 - one (Example 2) on a variety of plants by either the soil drench or foliar application method. These results are typical of the other compounds of this invention.

TABLE XI.—TYPICAL PLANT RESPONSES OBTAINED WITH EXAMPLE 1

| Plant species | Response observed* | Dosage range (lb./a.) |
|---|---|---|
| Apple (seedlings) (Malus sylvestris) | Stem (high dosage); leaf epinasty | 1–20 |
| Barley (Hordeum vulgare) | Stem; seed (higher dosages); initiation of flowering delayed (higher dosages) | 0.75–3 |
| Barnyardgrass (Echinochloa crusgalli) | Stem (slightly); seed | 1.10 |
| Beans (dwarf) (Phaseolus vulgaris) | Seed (higher dosages); number of bean pods increased; malformation of leaves | 1/16–20 |
| Cocklebur (Zanthium pensylvanicum) | Stem (high dosage); malformation of burrs | 1–20 |
| Corn (Zea maize) | Stem (slightly) | 0.5–10 |
| Cotton (Gossypium herbaceum) | Stem (higher dosages) | 0.5–8 |
| Cucumber (Cucumis stivus) | Seed; cucumber fruit increased in number | 0.5–4 |
| Eggplant (Solanum melongena) | Plants transplanted 2 weeks before treatment were dead or retarded | 0.5–4 |
| Flax (Linum usitatissium) | Stem (slightly); seed (higher dosages) | 0.5–4 |
| Grape (seedlings) (Vitis vinifera) | Stem; leaf epinasty (high dosage) | 2–20 |
| Mimosa (seedlings) (Acacia armata) | Stem | 1–8 |
| Nutgrass (Cyperus esculentus) | Stem (slightly) | 5 |
| Oats (Avena sativa) | Stem; seed (higher dosages); number and weight of heads increased | 0.75–3 |
| Peach (seedlings) (Prunus persica) | Stem (slightly) | 1–8 |
| Pigweed (Amaranthus retroflexus) | Stem; seed (higher dosages); length of flower heads decreased | 1–10 |
| Rice (Lryza sativa) | Stem; broader leaves | 0.5–8 |
| Rye (Secale cereale) | Stem; seed (higher dosages) | 0.25–5 |
| Safflower (Carthamus tinctorius) | Stem; seed (higher dosages) | 0.5–4 |
| Soybeans (Glycine max) | Stem (slightly); seed (higher dosages) | 0.5–4 |
| Squash (Curcurbita pepo) | Seed (higher dosages); number of squash fruit increased | 0.5–4 |
| Sugar beets (Beta vulgaris) | Decreased foliage weight and increased beet weight | 0.5–8 |
| Tomato (Lycopersicum esculentum) | Flowering prolonged; fruit setting and development delayed | 0.5–4 |
| Turf grasses | Stem | 1–10 |
| Wheat (Triticum vulgare) | Stem; seed (higher dosages); plants had shorter, thicker stems and shorter, broader and thicker leaves | 1/16–20 |

*Stem = stem elongation inhibited; Seed = seed formation inhibited.

In similar tests, by foliar application, no appreciable growth inhibition was observed on carrot (*Daucus carota*), chrysanthemum (*Chrysanthemum* spp.), radish (*Raphanus sativus*), sunflower (*Helianthus annus*) and turnip (*Brassica rapa*).

When the compounds of this invention are applied to plants or to the habitat of plants, they give a growth regulating response in the dosage range of about 0.01 to 30 pounds per acre (0.011 to 33 kilos per hectare). At the higher dosages, herbicidal responses may be manifested. Depending on the type of response desired the amount will vary with the plant species to be treated. Generally the preferred range is from 0.05 to 15 pounds per acre. Seeds may be treated with the compounds themselves or with any concentration of a solution or formulation of them.

The compounds of this invention may be employed as plant growth response agents either individual or as a mixture of two or more of them. They also may be used in combination with other plant growth regulatory compounds such as maleic hydrazide, succinic acid 2,2-dimethylhydrazide, choline and its salts, (2-chloroethyl)trimethylammonium chloride, triiodobenzoic acid, tributyl-2,4-dichlorobenzylphosphonium chloride, polymeric N-vinyl-2-oxazolidinones, tri(dimethylaminoethyl) phosphate and its salts, and N-dimethylamino-1,2,3,6-tetrahydrophthalamic acid and its salts. The compounds of this invention may also be combined with a herbicide for use on plants which are not sensitive to the herbicide at weed controlling rates. For example, they may be combined with 2,4-D for use on monocotyledonous plants such as cereals and turf grasses, with 3',4'-dichloropropionanilide for use on rice or with 2,4-dichlorophenyl 4-nitrophenyl ether for use on rice and other cereals.

The compounds of this invention may be applied in liquid carriers. One preferred group of the compounds are the water soluble salts, in which case water is the preferred carrier. Nonphytotoxic organic solvents such as ketones, alcohols, glycols, dimethylformamide and dimethyl sulfoxide may be employed. If desired a surfactant such as a wetting agent may also be used and this usually constitutes a minor part (in general less than 10%) of the solution or formulation. The surface active agents may be anionic, cationic or non-ionic. For the water-soluble salts cationic and non-ionic surfactants are preferred. Commonly used surfactants are well-known in the art and may be found in John W. McCutcheon's publication "Detergents and Emulsifiers, 1967 Annual," John W. McCutcheon Inc., Morristown, New Jersey.

The compounds of this invention may be formulated in various ways as for example emulsifiable concentrates, wettable powders, dusts, granules and pellets. Usually for application to the plant or plant parts or the plant habitat, the formulations are extended with a suitable carrier. Emulsifiable concentrates are most usually extended with a liquid carrier such as water and dusts; granules and pellets are most usually extended with a solid carrier such as mineral clays.

Emulsifiable concentrates may be made by dissolving the compounds in an organic solvent and adding one or more solvent-soluble emulsifying agents. Suitable solvents are usually water-immiscible and may be found in the hydrocarbon, chlorinated hydrocarbon, ketone, ester, alcohol and amide classes of organic solvents.

Wettable powders may be made by incorporating the compounds in an inert, finely divided solid carrier along with a surfactant which may be one or more emulsifying, wetting, dispersing or spreading agents or blends of these. Suitable carriers may be found in the classes of clays, silicates, silicas, limes, carbonates and organic carriers.

Solid compositions in the form of dusts may be made by compounding the compounds of this invention with inert carriers conventionally employed for the manufacture of pesticidal dusts for agricultural use, such as talcs, finely particled clays, pyrophyllite, diatomaceous earth, magnesium carbonate or wood or walnut shell flours.

Granular or pelletized formations may be made by incorporating the compounds into granular or pelletized forms of agronomically acceptable carriers such as granular clays, vermiculite, charcoal, ground corn cobs or bran.

Representative compounds of this invention have shown fungicidal activity. For example, the compound of Example 2 has given control of bean powdery mildew (*Erisiphe polygoni*) and the compounds of Examples 5, 10 and 25 have given good control of tomato late blight (*Phytophthora infestans*).

The growth regulatory action of the compounds of the present invention may be advantageously employed in various ways. The production of shorter and thicker stems in cereal grains reduces the tendency toward lodging. Turf grasses may be maintained at a low height and the necessity for frequent mowing alleviated. The plant growth on embankments, such as roadsides, may be controlled to prevent erosion and at the same time maintain its aesthetic value. There may be an advantage in producing a dormant period in certain plants. The control of flowering and fruiting may be advantageous in the production of seedless fruit and for hybridization. Delaying the vegetative process or altering the time of flowering and fruiting may result in more advantageous harvest dates or increased flower, fruit and/or seed production. The chemical pruning of trees, shrubs, ornamentals and nursery stock may be beneficial. Other applications of the compounds of the present invention will suggest themselves to those skilled in the art of agriculture and horticulture.

We claim:
1. A compound of the formula

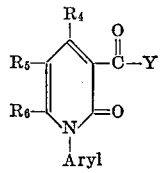

wherein $R_4$ and $R_6$ are methyl or ethyl, $R_5$ is hydrogen, methyl, ethyl or chlorine, Y is selected from the group consisting of Br, Cl, $NH_2$ and OR wherein R is chosen from the group consisting of hydrogen, alkyl groups of 1 to 5 carbon atoms and a phsiologically acceptable salt-forming cation, aryl is selected from the group consisting of

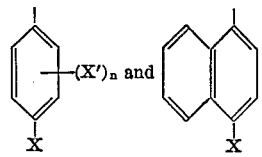

wherein
X is selected from the group consisting of amino, fluoro, chloro, bromo, iodo, alkyl of 1 to 5 carbon atoms, trifluoromethyl, methoxy and nitro,
X' is selected from the group consisting of fluoro, chloro, bromo, iodo, methyl, trifluoromethyl and methoxy,
n is 0, 1 or 2, and
X in

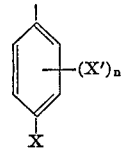

may be hydrogen when n is 1 or 2 and X' is at least one halogen in the 3-position.

2. The compound 1-(4-chlorophenyl)-3-carboxy-4,6-dimethylpyrid-2-one.

3. The compound of claim 2 wherein the said salts are water-soluble salts.

4. The compound 1-(3,4-dichlorophenyl)-3-carboxy-4,6-dimethylpyrid-2-one and salts thereof.

5. The compound of claim 4 wherein the said salts are water-soluble salts.

References Cited

UNITED STATES PATENTS 2,947,754   8/1960   Scudi et al. _____ 260—295.5
3,144,388   8/1964   Kuhnis et al. _____ 260—294.9

ALAN L. ROTMAN, Primary Examiner

U.S. Cl. X.R.

71—94; 260—295.5-A; 295.5-B

UNITED STATES PATENT OFFICE
CERTIFICATE OF CORRECTION

Patent No. 3,576,814          Dated April 27, 1971

Inventor(s) Michael C. Seidel, Kenneth L. Viste, Roy Y. Yih

It is certified that error appears in the above-identified patent and that said Letters Patent are hereby corrected as shown below:

In the claims, claim 2 should read:

2. The compound 1-(4-chlorophenyl)-3-carboxy-4 6-dimethylpyride-2-one and salts thereof.

Signed and sealed this 23rd day of November 1971

(SEAL)
Attest:

EDWARD M. FLETCHER, JR.      ROBERT GOTTSCHALK
Attesting Officer              Acting Commissioner of Patents